United States Patent [19]

Mok et al.

[11] Patent Number: 5,378,800
[45] Date of Patent: Jan. 3, 1995

[54] TEREPHTHALIC ACID COPOLYAMIDES

[75] Inventors: Steven L. Mok, Kingston, Canada; Rolando U. Pagilagan, Parkersburg, W. Va.

[73] Assignees: E. I. Du Pont de Nemours and Company, Wilmington, Del.; Du Pont Canada Inc., Mississauga, Canada

[21] Appl. No.: 917,024

[22] PCT Filed: Dec. 11, 1991

[86] PCT No.: PCT/CA91/00442

§ 371 Date: Aug. 12, 1992

§ 102(e) Date: Aug. 12, 1992

[87] PCT Pub. No.: WO92/10525

PCT Pub. Date: Jun. 25, 1992

Related U.S. Application Data

[63] Continuation-in-part of Ser. No. 626,015, Dec. 12, 1990, abandoned.

[51] Int. Cl.⁶ ............................................. C08G 69/26
[52] U.S. Cl. ...................................... 528/349; 528/338; 528/339; 528/340; 528/347; 428/395; 428/474.4
[58] Field of Search ............... 528/349, 347, 338, 339, 528/340; 428/395, 474.4

[56] References Cited

U.S. PATENT DOCUMENTS

| | | | |
|---|---|---|---|
| 2,752,328 | 6/1956 | Magat | 260/78 |
| 3,150,113 | 9/1964 | Gabler | 260/33.4 |
| 3,454,536 | 7/1969 | Schade et al. | 528/347 |
| 4,047,908 | 9/1977 | Steigelmann et al. | 55/158 |
| 4,111,921 | 9/1978 | Bier et al. | 528/338 |
| 4,163,101 | 7/1979 | Schade et al. | 528/347 |
| 4,607,073 | 8/1986 | Sakashita et al. | 524/404 |
| 4,925,914 | 5/1990 | Dolden et al. | 528/336 |
| 4,937,315 | 6/1990 | Barthelemy | 528/349 |
| 4,937,322 | 6/1990 | Barthelemy | 528/340 |
| 5,109,106 | 4/1992 | Lahary et al. | 528/349 |
| 5,153,250 | 10/1992 | Sinclair | 524/230 |
| 5,302,691 | 4/1994 | Soelch | 528/349 |

FOREIGN PATENT DOCUMENTS

| | | |
|---|---|---|
| 0305146 | 3/1989 | European Pat. Off. . |
| 0309095 | 3/1989 | European Pat. Off. . |
| 0310752 | 12/1989 | European Pat. Off. . |
| 0394029 | 10/1990 | European Pat. Off. . |
| 82/41027 | 8/1969 | Japan . |
| 47-42395 | 10/1972 | Japan . |
| 61/162550 | 1/1985 | Japan . |
| 914456 | 1/1963 | United Kingdom . |
| 1579274 | 11/1980 | United Kingdom . |
| WO91/15537 | 10/1991 | WIPO . |

Primary Examiner—John Kight, III
Assistant Examiner—P. Hampton-Highhtower

[57] ABSTRACT

A partially crystalline copolyamide formed from an aromatic carboxylic acid that is terephthalic acid or a mixture of terephthalic acid and isophthalic acid containing less than 40% of isophthalic acid, and an aliphatic diamine that is a mixture of hexamethylene diamine and 2-methyl pentamethylene diamine. The aliphatic diamine is at least 40%, molar basis, of hexamethylene diamine and the amount of isophthalic acid plus 2-methyl pentamethylene diamine is in the range of 15–35%, molar basis, of the total amount of aromatic carboxylic acid and aliphatic diamine. The copolyamides have a melting point of 280°–330° C. The copolyamide preferably has a heat of fusion of greater than 17 J/g. The copolyamide may be moulded into articles, spun into fibres or formed into films, and used in a wide variety of end-uses especially where high temperature properties are required.

11 Claims, No Drawings

TEREPHTHALIC ACID COPOLYAMIDES

CROSS REFERENCE TO RELATED APPLICATION

This application is a continuation-in-part of U.S. application Ser. No. 07/626,015 filed Dec. 12, 1990, now abandoned entitled Terephthalic Acid Copolyamides.

The present invention relates to copolyamides of terephthalic acid, optionally containing isophthalic acid, and mixtures of a diamine e.g. hexamethylene diamine, and 2-methyl-1,5-pentamethylene diamine, and especially to copolyamides having melting points of at least 280° C., and in embodiments of greater than 300° C.

Polymers formed from terephthalic acid and diamines are known in the art. For instance, U.S. Pat. No. 2,752,328 of E. E. Magat, which issued Jun. 26, 1956 describes a polymer formed from terephthalic acid and a methyl-substituted diamine having from 6 to 8 carbon atoms in the hydrocarbon chain of the diamine. It is disclosed that corresponding polymers formed from 3-methyl-pentamethylene diamine were spinnable polymers but the fibres obtained were weak and brittle. The patent does not disclose copolymers. UK Patent 914 456 of W. R. Grace & Co., published Jan. 02, 1963 discloses similar polymers formed from ethyl-substituted diamines.

Japanese patent publication 82-41027 of Toyo Rayon, published Aug. 23, 1969 discloses a method for the manufacture of polyamides from terephthalic acid and pentamethylene diamines having methyl substituents on the hydrocarbon chain. Reference is made to the process described in the aforementioned patent of Magat. The Japanese reference exemplifies the polymerization of 2-methyl pentamethylene diamine and terephthalic acid in the presence of water in a sealed system.

Japanese published patent application (Kokai) 61-162550 of K. Hikami et al, published Jul. 23, 1986 discloses polyamides formed from 0.4–0.6 mole of aromatic diamines and/or aromatic carboxylic acids per mole of polyamidemonomer forming composition, which have melting points of 250°–300° C. If the polyamide is formed from both terephthalic acid and isophthalic acid, then the ratio of those acids must be in the range of 4:6 to 6:4. A number of diamines are disclosed, including 2-methyl pentamethylene diamine, but all of the examples illustrating the invention are of copolymers of terephthalic acid, isophthalic acid and hexamethylene diamine. Polymers having melting points of above 300° C. were stated to have poor moldability.

it has now been found that copolymers of terephthalic acid, optionally including isophthalic acid, and mixtures of hexamethylene diamine and 2-methyl pentamethylene diamine, in which copolymers the amount of isophthalic acid is less than 40%, and having melting points above 280° C. may be formed and that such polyamides are capable of being melt processed.

Accordingly, the present invention provides a partially crystalline copolyamide formed from aromatic carboxylic acid and aliphatic diamine, said aromatic carboxylic acid being selected from the group consisting of terephthalic acid and mixtures of terephthalic acid and isophthalic acid in which mixtures the amount of isophthalic acid is less that 40%, molar basis, of the mixture, and said aliphatic diamine is a mixture of hexamethylene diamine and 2-methyl pentamethylene diamine, said aliphatic diamine containing at least 40%, molar basis, of hexamethylene diamine, said copolyamide having a melting point in the range of from 280° to 330° C.

In a preferred embodiment of the copolyamide of the invention, the amount of isophthalic acid plus 2-methyl pentamethylene diamine is 15–35%, molar basis, of the total amount of aromatic carboxylic acid and aliphatic diamine.

In a further embodiment, the carboxylic acid is terephthalic acid.

In yet another embodiment, the heat of fusion of the copolyamide is greater than 17 Joules/g. Hereinafter, the word "Joules" is abbreviated "J".

The present invention also provides a process for the preparation of a copolyamide comprising the steps of:

(a) feeding to a reactor an aqueous salt solution of an admixture of aromatic carboxylic acid and aliphatic diamine, said aromatic carboxylic acid being selected from the group consisting of terephthalic acid and mixtures of terephthalic acid and isophthalic acid in which mixtures the amount of isophthalic acid is less that 40%, molar basis, of the mixture, and said aliphatic diamine is a mixture of hexamethylene diamine and 2-methyl pentamethylene diamine, said aliphatic diamine containing at least 40%, molar basis, of hexamethylene diamine;

(b) heating the aqueous salt solution under pressure until the pressure in the reactor reaches at least 1300 kPa, water and other volatile matter being vented from the reactor:

(c) when the temperature of the reaction mixture has reached a temperature of at least 250° C., reducing the pressure in the reactor to atmospheric pressure over a period of at least 15 minutes in a manner that avoids excessive foaming of the reaction mixture;

(d) maintaining the reaction mixture at a pressure that is not greater than about atmospheric pressure until the copolyamide has reached a predetermined molecular weight; and (e) discharging the copolyamide so obtained from the reactor.

In a preferred embodiment of the process of the invention, in step (d), the reaction mixture is maintained under a vacuum.

In a further embodiment, the temperature in step (c) is in the range of 270°–310° C.

In another embodiment, the copolyamide has a melting point of greater than 300° but less than 330° C.

The present invention further provides a fibre formed from a partially crystalline copolyamide formed from aromatic carboxylic acid and aliphatic diamine, said aromatic carboxylic acid being selected from the group consisting of terephthalic acid and mixtures of terephthalic acid and isophthalic acid in which mixtures the amount of isophthalic acid is less that 40%, molar basis, of the mixture, and said aliphatic diamine is a mixture of hexamethylene diamine and 2-methyl pentamethylene diamine, said aliphatic diamine containing at least 40% molar basis, of hexamethylene diamine, said copolyamide having a melting point in the range of from 280° to 330° C.

In a preferred embodiment, the fibre is formed from a copolyamide that has a heat of fusion of greater than 17 J/g.

In a further embodiment, the fibre has a tenacity of at least 1.5 g/denier and a modulus of at least 30 g/denier.

In another embodiment, the copolyamide of the fibre has an inherent viscosity in the range of 0.5 to 1.5 dL/g, especially in the range of 0.8 to 1.1, inherent viscosity being measured on a 5 g/dL, solution of m-cresol at 25° C.

The present invention relates to partially crystalline copolyamides formed from an aromatic carboxylic acid and a mixture of hexamethylene diamine and 2-methyl pentamethylene diamine. The aromatic carboxylic acid is terephthalic acid or a mixture of terephthalic acid and isophthalic acid. In such mixtures, the amount of isophthalic acid is less than 40%, molar basis, of the mixture. In preferred embodiments, the acid is 100%, molar basis, of terephthalic acid.

The amounts of acid and diamines should be substantially complementary on a molar basis, as will be appreciated by persons skilled in the art. An excess of acids or diamines, especially the latter, may be used depending on the desired characteristics of the copolyamide and the nature and extent of side reactions that may produce volatile or other matter. The ratio of hexamethylene diamine to 2-methyl pentamethylene diamine is at least 40:60 i.e. at least 40% of the aliphatic diamine is hexamethylene diamine, on a molar basis. In addition, the amount of isophthalic acid plus 2-methyl pentamethylene diamine is preferably in the range of 15-35%, molar basis, of the total amount of aromatic carboxylic acid and aliphatic diamine, especially in the range of 20-30%, molar basis, of the total amount of aromatic carboxylic acid and aliphatic diamine.

The copolyamides of the present invention have a melting point of greater than 280° and less than 330° C., especially greater than 300° C. In addition, the copolyamide is a partially crystalline polymer, rather than an amorphous polymer. In embodiments, the polymer has a heat of fusion of greater than 17 J/g. Crystallinity may be determined using a differential scanning calorimeter.

In an embodiment of the invention, the copolyamide is prepared in a polymerization process in which an aqueous salt solution of the aromatic carboxylic acids, hexamethylene diamine and 2-methyl pentamethylene diamine is fed to a reactor. The presence of 2-methyl pentamethylene diamine appears to moderate branching that is understood to occur in a copolymer of terephthalic acid isophthalic acid and hexamethylene diamine. The molar amount of aromatic acid is substantially complementary to the total molar amount of the diamines, as discussed above. As is known, diamines tend to be more volatile than carboxylic acids and thus it may be desirable to feed an excess of diamine to the reactor.

In an embodiment of the process, the aqueous salt solution is heated in a reactor (autoclave) under pressure until the pressure reaches at least 1300 kPa, preferably at least 1900 kPa. Water and other volatile matter, which may include diamine, is vented from the reactor. When the temperature of the reaction mixture has reached at least 250° C., especially a temperature in the range of 270°–310° C., the pressure in the reactor is then reduced to atmospheric pressure over a period of at least 15 minutes, especially 20 to 90 minutes. The pressure is reduced in a manner that minimizes or avoids excessive foaming of the reaction mixture in the reactor. Anti-foam agents may be added to reduce the amount of foaming. The reaction mixture is then maintained at about atmospheric pressure or under a vacuum until the copolyamide has reached a predetermined molecular weight. The copolyamide thus obtained is discharged from the reactor. It should be understood, however, that the copolyamides may be manufactured using solid phase polymerization, extrusion polymerization, continuous polymerization and the like.

The copolyamides of the invention may be blended with stabilizers, flame retardants, smoke depressants, plasticizers, conductive and/or anti-static agents, lubricants and mould release agents, nucleating agents, dyes and pigments, fillers including glass fibres, minerals, toughening and other modifying agents, and other additives that may be used in polyamide compositions. Examples of heat stabilizers include copper(I) halides e.g. bromide and iodide, and alkali halides e.g. lithium, sodium and potassium bromides and iodides, which may be used with or without phosphorus compounds. Examples of the latter are phosphites, phosphines, phosphates and alkali metal salts of phosphorus acids e.g. sodium phenyl phosphinate, sodium hypophosphite, triaryl- and tris(alkylaryl) phosphines e.g. tri-n-butyl phosphine, phenyl dimethyl phosphine and triphenyl phosphine. The organic heat stabilizers include hindered phenols and hindered amines, as well as UV stabilizers and phenolic metal deactivators. Nucleating agents include talc, calcium fluoride and salts of phosphorus acids, for example sodium phenyl phosphinate.

A wide range of fillers may be used e.g. in amounts of 0.5–200 parts of filler per 100 parts of copolyamide. Examples of such fillers include, but are not limited to, silica, metasilicates, alumina, talc, diatomaceous earth, clay, kaolin, quartz, glass, mica, titanium dioxide, molybdenum disulphide, gypsum, iron oxide, zinc oxide, fibres e.g. glass, carbon, boron, aromatic and ceramic fibres, powdered polytetrafluoroethylene and the like.

The copolyamides may be used in the manufacture of products using melt processing techniques, especially products intended for use at temperatures that are higher than those typically used with other polyamides. For example, the copolyamides may be formed into articles using injection moulding technology e.g. into valves, tanks, containers, washers and the like for automotive end-uses, into articles for electrical end-uses e.g. parts requiring resistance to temperatures of 260° C. or above, and articles where retention of mechanical properties under the influence of heat, moisture, hydrocarbons, alcohols including so-called gasohol, and the like are important. Alternatively, the polymers may be spun into fibres e.g. for sewing or industrial threads for end-uses where low shrinkage and elongation are important and/or retention of properties under the influence of moisture, hydrocarbons, alcohols and the like is important. The copolyamides may also be formed into film and sheet. Barrier properties of the copolyamides to water and oxygen may also find uses. The copolyamides may be particularly useful for end-uses where retention of properties at elevated temperatures is required, including as retortable containers.

In embodiments of the invention, the copolyamide is in the form of a fibre, or filament. The fibre preferably has a tenacity of at least 1.5 g/denier and a modulus of at least 30 g/denier.

The present invention is illustrated by the following examples.

EXAMPLE I

A 12 liter reaction vessel equipped with a helical ribbon agitator and a thermowell to measure reaction temperature was charged with 1271 g (8.588 moles) of 78.53% (weight basis) aqueous hexamethylene diamine solution, 998 g (8.588 mole) of 2-methyl pentamethylene diamine, 2659 g (16.006 mole) of terephthalic acid, 12 g of 47% (weight basis) of aqueous sodium phenyl phosphinate solution, 6 ml of 10% (weight basis) Carbowax ® 3350 polyethylene glycol in water and 1200 g of demineralized water.

With the reactor agitator rotating at 50 rpm, the mixture was heated to 130° C. and then vented to remove entrained oxygen. Subsequently, the reaction mixture was heated to 232° C. With the reaction pressure being maintained at 2400 kPa, volatile matter was released over a period of 43 minutes, during which time the temperature of the reaction mixture rose to 275° C. The pressure in the reactor was then reduced to atmospheric pressure over a period of 48 minutes, the temperature in the reaction mixture rising to 320° C.; the rate of agitation was reduced to 6 rpm when the temperature had reached 318° C.

The reaction mixture obtained was maintained under a vacuum (pressure reduction) of 40 kPa units for 15 minutes. The polymer obtained was then discharged from the reactor and quenched in a water bath.

The copolyamide obtained had an inherent viscosity (IV) of 0.98 dl/g; in this instance, inherent viscosity was measured on a 0.5 g/L solution in concentrated sulphuric acid at 25° C. The polymer had a melting point of 301° C., as measured by differential scanning calorimetry (DSC).

EXAMPLE II

A copolyamide similar to that described in Example I, with a heat of fusion of 29.4 J/g, was filled with glass fibre, mineral or toughening agent, moulded into test bars and subjected to a series of physical property measurements. The copolyamide used in this example was a copolymer formed from hexamethylene diamine and 2-methyl pentamethylene diamine (1:1) and terephthalic acid.

The glass filled copolyamide samples were prepared as follows: the copolyamide was blended in a V-shaped blender with a copper antioxidant, a phosphite antioxidant (Irgafos ® 168) and talc (about 0.35%). The resultant blended mixture and silanated long glass fibres were then fed through separate ports of a 20 mm Welding Engineers twin screw extruder that was operated with an extrusion temperature of 312° C. under vacuum. The resultant reinforced copolyamide was passed through a stranding die and chopped into pellets. In one composition containing 49 parts of glass fibre per 100 parts of copolyamide, the composition contained 4000 g of copolyamide, 23 g of antioxidant, 23 g of talc and 1990 g of silanated long glass fibres. In another composition containing 75 parts of glass fibre per 100 parts of copolyamide, the composition contained 3800 g of copolyamide, 68 g of antioxidant, 23 g of talc and 2936 g of silanated long glass fibres.

The rubber toughened compositions were prepared by blending 80.9 parts by weight of a copolymer having an inherent viscosity, measured in concentrated sulphuric acid, of 0.83 dl/g and a melting point of 301° C., with 10 parts of a fumaric acid-grafted ethylene/-propylene/hexadiene copolymer, 9.1 parts of an ethylene/propylene/hexadiene copolymer and 0.25 parts of talc. The blending was carried out in a 28 mm Werner & Pfleiderer twin screw extruder, using a melt temperature of 347° C. and a vacuum of 61 kPa. The resulting extrudate was quenched in water, cut into pellets and sparged with nitrogen until cool to remove surface moisture. The dried composition was moulded and tested.

The mineral reinforced compositions were prepared by blending 59.4 parts of the copolymer used to prepare the rubber toughened compositions, with 0.6 parts by weight of gamma-aminopropyltriethoxysilane for 10 minutes. 40 parts of Satintone TM Special clay were then added and tumble blended for 15 minutes. The resultant mixture was melt blended in the Werner & Pfleiderer extruder using a melt temperature of 350° C. and a vacuum of 54 kPa. The extrudate was quenched in water, cut into pellets and sparged with nitrogen until cool. The composition was then moulded and tested.

The copolyamide compositions were moulded into test specimens using an Engel ® or a Boy injection moulding machine. The test samples were Type I tensile bars as specified in ASTM procedure D638, and ¼" and ⅛" flexural bars as specified in ASTM procedure D790. The specimens were moulded using a mould temperature of 80° C. and an extruder barrel temperature of 320° C. Measurements were made using the following ASTM procedures: Flexural Modulus-D790; Tensile Strength-D638; Notched Izod Impact Strength-D256. Melting point and heat of fusion were determined under a nitrogen atmosphere using a differential scanning calorimeter (Du Pont 912 DCDSC), at a rate of temperature rise of 10° C. per minute, the temperature at the top of the endothermic curve being deemed to be the melting point. Glass transition temperature was determined by differential mechanical analysis at a rate of increase in temperature of 5° C./minute, operated under a nitrogen atmosphere.

Storage Modulus is measured using the procedure of ASTM D 4065-82, Measurements are made of viscoelastic behaviour using dynamic mechanical analysis, which provides information on an elastic component, known as storage modulus, and on a viscous component, known as loss modulus. Measurements made while the temperature is being changed lead to information on the $T_g$ of the polymer, a heating rate of 5° C. being used; data on $T_g$ reported herein was obtained from a plot of storage modulus against temperature, being the temperature of significant decrease in storage modulus with increasing temperature.

As a comparison, tests were also conducted on Zytel ® 70G33 glass-filled polyhexamethylene adipamide. Comparative data was also measured on Zytel 101 polyhexamethylene adipamide.

The results obtained are given in Table I. The copolyamide (Runs 3–7) had a melting point of 302° C. and a glass transition temperature of 126° C. The polyhexamethylene adipamide (Runs 1–2) had a melting point of 265° C. and a glass transition temperature of 61° C.

TABLE I

| | Run No. | | | | | | |
|---|---|---|---|---|---|---|---|
| | 1 | 2 | 3 | 4 | 5 | 6 | 7 |
| Filler | | | | | | | |
| Type | — | glass | — | glass | glass | mineral | tough* |
| Amount | 0 | 49 | 0 | 49 | 75 | 67 | 23 |

TABLE I-continued

|  | Run No. | | | | | | |
| --- | --- | --- | --- | --- | --- | --- | --- |
|  | 1 | 2 | 3 | 4 | 5 | 6 | 7 |
| Flexural Modulus ($10^3$ kg/cm$^2$, 23° C.) | | | | | | | |
| DAM** | 28.9 | 91.6 | 32.2 | 95.8 | 116 | 64.9 | 23.0 |
| 50% RH | 12.3 | 63.4 | 34.9 | 91.6 | 113 | 73.8 | 22.8 |
| Tensile Strength (kg/cm$^2$, 23° C.) | | | | | | | |
| DAM | 845 | 1900 | 796 | 1900 | 2110 | 958 | 620 |
| 50% RH | 789 | 1270 | 831 | 1830 | 2040 | 796 | 627 |
| Notched Izod Impact Strength ($10^3$ kg/cm$^2$, 23° C.) | | | | | | | |
| DAM | 5.45 | 10.9 | 3.27 | 7.09 | 8.73 | 3.27 | 90.5 |
| 50% RH | 11.5 | 10.9 | 2.4 | 7.09 | 8.73 | 2.18 | 78.5 |
| Storage Modulus ($10^3$ kg/cm$^2$) | | | | | | | |
| 25° C. | — | 79.6 | — | 93.0 | 110 | — | — |
| 50° C. | — | 62.0 | — | 88.1 | 109 | — | — |
| 125° C. | — | 44.4 | — | 84.5 | 94.4 | — | — |
| 150° C. | — | 39.5 | — | 52.8 | 59.9 | — | — |

*toughener, a blend of 12 parts of a grafted polyolefin formed by high temperature grafting and 11 parts of EPDM elastomer
**DAM = dry as moulded
NOTE: Runs 1-2 are polyhexamethylene adipamide and Runs 3-7 are copolyamide of the invention.

This example shows that the unfilled copolyamides are stiffer than polyhexamethylene adipamide and resistant to moisture, as shown by the retention of stiffness at increased relative humidity. Similar behaviour was observed in glass-filled, mineral-filled and toughened compositions.

EXAMPLE III

A copolyamide of the type used in Example II was subjected to a fibre-spinning process. The copolyamide was pumped at a rate of approximately 2.2 kg/hr through a die with seven orifices, having a diameter of 0.23 mm, at a spinneret temperature of 318° C., and then drawn over a series of hot rolls and plates to achieve the overall draw ratio.

The tensile properties of the fibre viz. modulus, breaking strength, tenacity and elongation, were measured using an Instron ® apparatus. Shrinkage was measured by exposing the fibre to hot air at a temperature of 177° C. for two minutes and measuring the amount of shrinkage.

The yarn obtained had a high modulus and a low hot air shrinkage.

Further details and the results obtained are given in Table II. Fiber properties were measured on fibres with 7 filaments

TABLE II

|  | Run No. | | |
| --- | --- | --- | --- |
|  | 8 | 9 | 10 |
| Decitex | 92 | 56 | 48 |
| Draw Ratio | 3.2 | 4.3 | 4.8 |
| Fibre Properties | | | |
| Break Strength (Newtons) | 1.6 | 1.7 | 1.8 |
| Elongation (%) | 20 | 10.6 | 8.5 |
| Tenacity (gram/denier) | 2.0 | 3.5 | 4.2 |
| Modulus (gram/denier) | 34 | 63 | 88 |
| Shrinkage (%) | 1.3 | — | 5.5 |

Note: Decftex is measured by the procedure of ASTM D-1907; Break Strength, Elongation, Tenacity, Modulus and Shrinkage are all measured by the procedure of ASTM D-885; Break Strength is reported in Newtons, Elongation is reported in percent, Tenacity and Modulus are reported in g/denier, and Shrinkage is reported in percent.

This example shows that fibres may be spun from the polymers described herein. It is believed that the draw ratio obtained was important with respect to the properties of the fibres, and that the draw temperatures may have been significant factors in the operation of the fibres process.

EXAMPLE IV

A series of polymers were prepared from terephthalic acid and isophthalic acid and a mixture of hexamethylene diamine and 2-methylene pentamethylenediamine by polymerization in an autoclave. Further details and physical characteristics of the polymers obtained are given in Table III; the glass transition temperature information was obtained on samples that had been moulded.

TABLE III

|  | Run No. | | | | | | |
| --- | --- | --- | --- | --- | --- | --- | --- |
|  | 11 | 12 | 13 | 14 | 15 | 16 | 17 |
| Composition | | | | | | | |
| 6T | 55 | 60 | 50 | 60 | 60 | 50 | 50 |
| 6I | 5 | 0 | 10 | 10 | 10 | 40 | 20 |
| 2MPMD,T | 40 | 40 | 40 | 30 | 30 | 10 | 30 |
| Inherent Viscosity (dl/g) | 0.94 | 0.90 | 0.72 | 0.77 | 0.79 | 0.74 | 0.80 |
| Melting Pt (°C.) | 301 | 306 | 295 | 309 | 305 | 288 | 302 |
| Glass Transition temperature, $T_g$ | | | | | | | |
| DAM | 149 | 143 | 140 | 138 | 141 | 113 | 124 |
| 50% RH | 122 | 117 | 106 | 114 | 110 | — | — |
| 100% RH | 73 | 76 | 70 | 73 | 74 | — | — |
| Heat of Fusion (J/g) | 32.9 | 37.4 | 26.8 | 34.8 | 38.0 | — | — |

Note: Inherent Viscosity was measured in sulphuric acid, except for Runs 16 and 17 where m-cresol was used; the methods of measurement are believed to be substantially equivalent.

The results show effects of use of mixtures of terephthalic acid and isophthalic acid in the manufacture of the copolyamides, and the effect on the properties of the polymer obtained.

EXAMPLE V

An autoclave was charged with 51.30 g (0.3089 tool) of terephthalic acid, 26.26 g (0.2260 mol) of hexamethylene diamine in the form of an aqueous solution, 11.46 g (0.09865 mol ) of 2-methyl pentamethylene diamine, 36.77 g of water (total amount) and 0.15 g of sodium phenyl phosphinate; this represent a charge of 30.4% of 2-methyl pentamethylene diamine and 69.6% of hexamethylene diamine. A pressure of nitrogen (200 kPa) was applied, at ambient temperature, and the autoclave was heated to 290° C.; venting was begun at approximately 270° C. controlled by a release valve set at 2400 kPa. After 90 minutes, the melt temperature had reached 290° C., and the pressure was reduced to ambient over a period of one hour, during which time the melt temperature increased to 310° C. The melt was held at ambient pressure and 310° C. for 10 minutes after which the polymer was permitted to cool 1 to about 50° C. under nitrogen pressure before removal from the autoclave.

A sample of milled dried polymer had an inherent viscosity of 0.85 dl/g, a melting point of 328° C. and a heat of fusion of 49.33 J/g.

EXAMPLE VI

This example illustrates the heat aging properties of 6T/2MPMD,T (50:50) copolymer and nylon 66.

The polymers were dry blended with heat stabilizer or antioxidants in a blender. The resultant mixtures were then compounded with glass fibres using a 20 mm twin screw extruder, from Welding Engineering Inc., to form heat stabilised reinforced polymer compositions. These compositions were then injection moulded into tensile bars using the procedure described in Example II.

The tensile bars were suspended in an hot air circulating oven for the period of time (see Table IV below) at a constant temperature of 180° C. At the specified time interval, five tensile bars of each composition were withdrawn from the oven and sealed into moisture proof bags. Tensile strength was subsequently determined on dry-as-moulded (DAM) samples, using the procedure of ASTM D638.

The results obtained are given in Table IV.

TABLE IV

| | Run No. | | |
|---|---|---|---|
| | 18 | 19 | 20 |
| Polymer | 66 | COPOLYM. | COPOLYM. |
| Copper Halide Stabiliser, wt % | 0.40 | 0.40 | — |
| Irganox ® 1098, wt % | — | — | 0.25 |
| Naugard ® XL-1, wt % | — | — | 0.20 |
| Naugard ® 445, wt % | — | — | 0.25 |
| Irgafos ® 168, wt % | — | — | 0.35 |
| Talc, wt % | — | 0.35 | 0.40 |
| Fibreglass, wt % | 33 | 33 | 40 |
| Retention of Tensile Strength after heat aging, % | | | |
| 0 hr | 100 | 100 | 100 |
| 2256 hrs | 69 | 75 | 58 |
| 3360 hrs | 43 | 58 | — |
| 4704 hrs | 32 | 58 | 38 |

The copolymer exhibited better retention of properties (tensile strength) on heat aging than nylon 66 when using the same quantity of the inorganic heat stabilizer. When using organic stabilizers, the copolymer exhibited similar retention of tensile strength after aging for 4704 hours as did the nylon 66 using the copper halide stabilizer.

EXAMPLE VII

This example illustrates the effects of nucleating agents on the 6T/2MPMD,T (50/50) copolymer.

Samples of the polymer were compounded with nucleating agents using a single screw extruder, as shown in Table V. During the preparation of the samples, a small quantity of a benzenesulfonamide-type plasticiser was used as a binding agent for the nucleants.

A differential scanning calorimetry (DSC) method was used to analyse the nucleating effect oil the polymer, by comparison of the freezing points of the compositions containing nucleating agent.

Further details and the results obtained are given in Table V.

TABLE V

| | Run No. | | | |
|---|---|---|---|---|
| | 21 | 22 | 23 | 24 |
| Plasticiser, wt % | 0.0 | 0.2 | 0.2 | 0.2 |
| Nucleating agent | | | | |
| Type | — | sodium phenyl phosphinate | talc | carbon black |
| wt % | 0.0 | 0.5 | 0.5 | 0.1 |
| DSC Results | | | | |
| Melting Point, °C. | 304 | 303 | 303 | 303 |
| Freeze Point, °C. | 262 | 272 | 278 | 272 |
| Difference, °C. | 42 | 31 | 25 | 31 |

Due to the slow crystallization rate of the copolymer, nucleating agents were shown to be effective in improving the crystallization rate, as indicated by an increase in the freeze point.

EXAMPLE VIII

This example illustrates the properties of compositions of 6T/2MPMD,T (50:50) copolymer containing 60% by weight of glass.

Polymer was compounded with ¼" fibreglass in a twin screw extruder using barrel temperatures in the range of 325°14 355° C. The fibreglass was fed into the extruder through a side port located about half-way down the barrel of the extruder. The resultant compositions were extruded and moulded into ASTM test bars for physical properties testing, using procedures described above in Example II.

The results obtained are given in Table IX.

TABLE VI

| | Run No. | |
|---|---|---|
| | 25 | 26 |
| Polymer content, wt % | 100 | 40 |
| Fibreglass content, wt % | 0 | 60 |
| Properties | | |
| Tensile Strength, kg/cm$^2$ | 1630 | 2760 |
| Elongation, % | — | 2.1 |
| Flexural Modulus, kg/cm$^2$ | 31000 | 205000 |
| Flexural Strength, kg/cm$^2$ | — | 3960 |
| Notched Izod, kg-cm/cm | 4 | 14.1 |

The copolymer was capable of being compounded as a composition containing 60% by weight of glass fibres. The mechanical properties of the fibre-containing composition were strongly enhanced compared with the un-filled composition.

EXAMPLE IX

Plastic containers, approx. 250 ml in internal volume and 0.89 mm in nominal wall thickness, were injection moulded from a copolymer of hexamethylene diamine and 2-methyl pentamethylene diamine (50:50) and terephthalic acid that had au inherent viscosity of approximately 0.75 dL/g; inherent viscosity was measured on a 0.5 g/L solution of m-cresol at 25° C. These containers were conditioned for 2 hours in a "pressure cooker", to simulate a sterilization process in a retort autoclave.

The conditioned containers were then filled with water, sealed with an aluminum disc, using an epoxy cement to form an impermeable closure, and put in an atmospheric chamber, set at 20° C./50% relative humidity (RH). Weight loss of the containers was monitored at regular intervals. After a period of three (3) weeks exposure, the moisture permeation rate was calculated to be 0.0028g water/day for each container.

In comparative tests, containers made of nylon 6,6 evaluated under similar conditions exhibit a moisture permeation rate that is 10–20× higher than the copolyamide described above. Thus, the effect of use of the aromatic acid in the copolyamide as well as replacement of part of the diamine with 2-methylpentamethylene diamine resulted in a significantly decrease in the moisture barrier properties, compared with nylon 6,6.

EXAMPLE X

A 12 liter reaction vessel equipped with a helical ribbon agitator and a thermowell to measure reaction temperature, was charged with 2659 g (16.01 moles) of terephthalic acid, 935.3 g (8.06 moles) of 2-methyl pentamethylene diamine, 1597.9 g (8.06 moles) of 58.53% (weight basis) aqueous hexamethylene diamine solution, 205.9 g (1.03 moles) of dodecamethylene diamine, 12 g of 47% (weight basis) of aqueous sodium phenyl phosphinate solution, 6 ml of 10% (weight basis) Carbowax ® 3350 polyethylene glycol in water and 1100 g of demineralized water.

With the reactor agitator rotating at 50 rpm, the mixture was heated to 130° C. and then vented to remove entrained oxygen. Subsequently, the reaction mixture was heated to 237° C. With the reaction mixture being maintained at a pressure of 2.443 MPa, volatile matter was released to the atmosphere over a period of 68 minutes, during which time the temperature of the reaction mixture rose to 275° C. The pressure in the reactor was then reduced to atmospheric pressure over a period of 70 minutes, during which time the temperature in the reaction mixture rose to 320° C. The rate of agitation was then reduced to 5 rpm.

The reaction mixture obtained was maintained under a vacuum of 40 kPa units for 15 minutes. The polymer obtained was discharged from the reactor and quenched in a water bath.

The copolyamide obtained had an inherent viscosity (IV) of 0.90 dL/g; inherent viscosity was measured on a 0.5 g/L solution in m-cresol at 25° C. The polymer had a melting point of 300° C., as measured by differential scanning calorimetry (DSC), and a Tg (DAM, Dry As Moulded) of 127° C., as measured by differential mechanical analysis (DMA).

This example illustrates the preparation of copolyamide using a mixture of three aliphatic diamines.

EXAMPLE XI

This example illustrates the use of a two step process for the manufacture of the copolyamide in which a polymer of a low inherent viscosity is manufactured in an autoclave and then further polymerized in the solid state to a polymer having a higher inherent viscosity.

A copolyamide, made according to a process similar to that described in Example I, but having an inherent viscosity of 0.77 dL/g, was placed in an air tight container, through which dry $N_2$ gas was circulated continuously. The container was placed in an oven, which was set to give a polymer temperature of 222° C.; or 245° C; the $N_2$ was still being circulated. Samples were taken at regular intervals to determine the rate of change of inherent viscosity of the polymer.

Amine ends were measured by acid-base titration in phenol/methanol (90/10) as solvent, using a solution of perchloric acid in water (0.1N). Inherent Viscosity was measured in sulphuric acid.

The results obtained were as follows:

TABLE VII

|  | Time (hrs) | | | | | |
| --- | --- | --- | --- | --- | --- | --- |
|  | 0 | 4.5 | 7.25 | 8 | 16 | 24 |
| Polymer Temperature = 222° C. | | | | | | |
| Inherent viscosity | 0.77 | 0.85 | 0.84 | — | 0.91 | — |
| Amine ends | 92 | 81 | 83 | — | 68 | — |
| Polymer temperature = 245° C. | | | | | | |
| Inherent viscosity | 0.77 | — | — | 0.90 | 0.99 | 1.05 |
| Amine ends | 92 | — | — | 68 | 73 | 76 |

This example illustrates solid phase polymerization of copolyamides of the invention.

EXAMPLE XII

To further illustrate solid phase polymerization, copolyamides similar to that of Example I were polymerized in a 12 L autoclave under conditions similar to those given in Example I except that the vacuum cycle was omitted. The polymer was discharged from the autoclave and quenched in a water bath immediately after reduction of the pressure to atmospheric pressure.

The polymer obtained was placed in a small-scale solid phase polymerization unit, where it was heated to 240° C. under a steady flow of dry $N_2$ gas. Samples were taken at regular intervals.

The results of measurement of inherent viscosity (dL/g), measured in sulphuric acid, obtained were as follows:

TABLE VIII

|  | Time (hrs) | | |
| --- | --- | --- | --- |
| Polymer | 0 | 7 | 14 |
| A | 0.64 | 0.91 | 1.07 |
| B | 0.66 | 1.04 | 1.18 |
| C | 0.69 | 1.08 | 1.25 |
| D | 0.73 | 1.03 | 1.18 |

This example further illustrates the use of solid phase polymerization in the manufacture of copolyamides of the invention.

EXAMPLE XIII

A copolyamide was prepared in an autoclave from a terephthalic acid/isophthalic acid mixture (95/5 mole ratio) and a mixture of hexamethylene diamine/2- methyl pentamethylene diamine (50/50 mole ratio). The polymer was made under conditions similar to those given in Example I, except (a) the constant pressure-hold cycle was conducted at 1.896 MPa, and (b) the pressure let-down cycle was started when the melt had reached a temperature of 300° C. The copolyamide thus obtained had an inherent viscosity of 0.67 dL/g. It was then further polymerized in a solid-phase reactor so as to obtain a polymer having an inherent viscosity of 0.80 dL/g.

The properties of the copolyamide thus obtained were compared with those of a copolyamide of terephthalic acid and hexamethylene diamine/2-methyl pentamethylene diamine (50/50 mole ratio) with an inherent viscosity of 0.91 dL/g. Data was obtained from injection-moulded samples of the copolyamide as well as for the copolyamide filled with 33% by weight of glass fibre.

The results obtained were as follows:

TABLE IX

| | Polymer | | | | | |
|---|---|---|---|---|---|---|
| | E | E | F | F | G | G |
| Glass content (%) | 0 | 33 | 0 | 33 | 0 | 33 |
| Properties | | | | | | |
| Inherent Viscosity (dL/g) (m-cresol) | 0.67 | — | 0.80 | — | 0.91 | — |
| Amine ends | 164 | — | 119 | — | 86 | — |
| COOH ends | 10 | — | — | — | 10 | — |
| Melting pt. (°C.) | 296 | — | 296 | — | 300 | — |
| Tensile strength (MPa) | 39.3 | 182 | 67.6 | 194 | 62.7 | 198 |
| Elongation (%) | 3.4 | 7.4 | 6.4 | 8.4 | 5.9 | 8.2 |
| Flexural modulus (MPa) | 3061 | 9515 | 2965 | 9239 | 2861 | 9813 |
| Notched Izod (J/m) | 30 | 88 | 46 | 89 | 37 | 77 |
| Heat deflection temperature (°C., at 1.82 MPa) | 141 | 257 | 146 | 253 | 147 | 264 |

Note: Polymer E was formed from terephthalic and isophthalic acids (95/5 mole ratio) copolymerized with hexamethylene dismine and /2-methyl pentamethylene dismine (50/50 mole ratio);
Polymer F was Polymer E that had been subjected to solid phase polymerization; and
Polymer G was a copolyamide of terephthalic acid copolymerized with hexamethylene diamine and 2-methyl pentamethylene diamine (50/50 mole ratio)

This example illustrate the properties that are obtainable with copolyamides of the invention.

EXAMPLE XIV

Using procedures substantially as described in Example I, a series of copolyamides were polymerized from terephthalic acid, isophthalic acid, hexamethylene diamine and 2-methyl pentamethylene diamine.

The polymers were tested for melting point and temperature of crystallization. The copolyamide as obtained from the polymerization apparatus was subjected to differential scanning calorimetry (DSC), to determine the initial melting point. The copolyamide was then cooled and the temperature of crystallization was obtained. Finally, the copolyamide was reheated and the "final" melting point was determined.

Further details and the results obtained are given in Table X.

TABLE X

| Ratio of 6T/6I/ 2-MPMD,T | Reactants (MOLE %) | | | | DSC | | |
|---|---|---|---|---|---|---|---|
| | T | I | HMD | 2-MPMD | $T_m$ | $T_c$ | $T_f$ |
| 45/00/50 | 50 | — | 22.5 | 27.5 | 296 | 248 | 296 |
| 40/10/50 | 45 | 5 | 25 | 25 | 289 | 255 | 291 |
| 50/30/20 | 35 | 15 | 40 | 10 | 295 | 257 | 293 |
| 50/20/30 | 40 | 10 | 35 | 15 | 300 | 267 | 302 |
| 60/30/10 | 35 | 15 | 45 | 5 | 300 | 275 | 303 |
| 55/25/20 | 37.5 | 12.5 | 40 | 10 | 305 | 281 | 314 |
| 55/15/30 | 42.5 | 7.5 | 35 | 15 | 326 | 279 | 314 |
| 50/05/45 | 47.5 | 2.5 | 25 | 25 | 298 | 274 | 303 |
| 45/10/45 | 45 | 5 | 27.5 | 22.5 | 296 | — | — |
| 45/05/50 | 47.5 | 2.5 | 25 | 25 | 295 | 263 | 297 |

TABLE X-continued

| Ratio of 6T/6I/ 2-MPMD,T | Reactants (MOLE %) | | | | DSC | | |
|---|---|---|---|---|---|---|---|
| | T | I | HMD | 2-MPMD | $T_m$ | $T_c$ | $T_f$ |
| 40/30/30 | 35 | 15 | 35 | 15 | 296 | 271 | 298 |

Note:
T = terephthalic acid
I = isophthalic acid
HMD = hexamethylene diamine
2-MPMD = 2-methyl pentamethylene diamine
$T_m$ = initial melting point
$T_c$ = temperature of crystallization
$T_f$ = final melting point This example illustrates the variety of copolyamides that may be manufactured from the four reactants, and the range of melting and crystallization points obtained.

We claim:

1. A partially crystalline copolyamide formed from aromatic dicarboxylic acid and aliphatic diamine, said aromatic dicarboxylic acid consisting essentially of terephthalic acid and said aliphatic diamine consisting essentially of a mixture of hexamethylene diamine and 2-methyl pentamethylene diamine, said aliphatic diamine containing at least 40%, molar basis, of hexamethylene diamine, said copolyamide having a melting point in the range of from 280° to 330° C.

2. The copolyamide of claim 1 in which the amount of 2-methyl pentamethylene diamine is 15–35%, molar basis, of the total amount of aromatic carboxylic acid and aliphatic diamine.

3. The copolyamide of claim 2 in which the melting point is in excess of 300° C.

4. The copolyamide of claim in which the heat of fusion of the copolyamide is greater than 17 Joules/g.

5. A fibre formed from a partially crystalline copolyamide of claim 1.

6. The fibre of claim 5 in which the amount of 2-methyl pentamethylene diamine in the partially crystalline copolyamide is 15–35%, molar basis, of the total amount of aromatic carboxylic acid and aliphatic diamine, said copolyamide having a heat of fusion of greater than 17 J/g.

7. The fibre of claim 6 in which the fibre has a tenacity of at least 1.5 g/denier and a modulus of at least 30 g/denier.

8. The fibre of claim 7 in which the copolyamide of the fibre has an inherent viscosity, as measured on a 5 g/dL solution of m-cresol at 25° C., in the range of 0.5 to 1.5 dL/g.

9. The fibre of claim 8 in which the inherent viscosity is in the range of 0.8 to 1.1 dL/g.

10. A moulded article made from the partially crystalline copolyamide of claim 1.

11. A film or sheet made from the partially crystalline, copolyamide of claim 1.

* * * * *

UNITED STATES PATENT AND TRADEMARK OFFICE
CERTIFICATE OF CORRECTION

PATENT NO. : 5,378,800
DATED : Jan. 3, 1995
INVENTOR(S) : Mok et al.

It is certified that error appears in the above-indentified patent and that said Letters Patent is hereby corrected as shown below:

Column 14, line 46 after "claim" insert --2--.

Signed and Sealed this

Eleventh Day of June, 1996

Attest:

BRUCE LEHMAN

Attesting Officer     Commissioner of Patents and Trademarks

Adverse Decisions in Interference

Patent No. 5,378,800, Steven L. Mok, Rolando U. Pagilagan, TEREPHTHALIC ACID COPOLYAMIDES, Interference No. 103,693, final judgment adverse to patentees rendered December 2, 1997, as to claims 1-11.

*(Official Gazette April 21, 1998)*